Dec. 8, 1936.  A. W. BAUMGARTEN ET AL  2,063,291
TROLLEY COLLECTOR
Filed Oct. 9, 1933
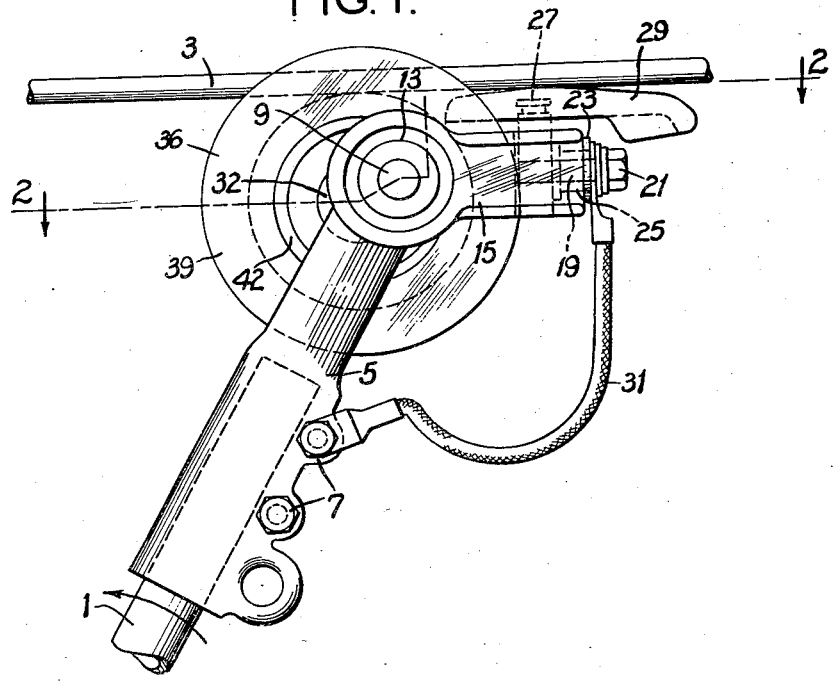
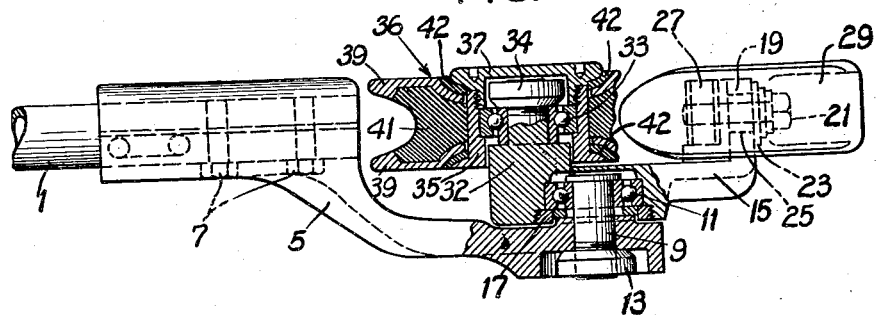
Arthur W. Baumgarten
Harvey S. Pardee,
Inventors.
Delos G. Haynes,
Attorney.

Patented Dec. 8, 1936

2,063,291

UNITED STATES PATENT OFFICE 2,063,291

TROLLEY COLLECTOR

Arthur W. Baumgarten, Joliet Township, Will County, and Harvey S. Pardee, Ravinia, Ill., assignors, by mesne assignments, to Hydromatic Corporation, Chicago, Ill., a corporation of Illinois Application October 9, 1933, Serial No. 692,848

5 Claims. (Cl. 191—58)

This invention relates to trolley collectors, and with regard to certain more specific features, to collectors each having in combination a trolley wheel and a sliding shoe to be used in connection with sprung trolley poles.

The invention is an improvement upon the construction disclosed in United States Patent 1,747,924, dated February 18, 1930.

Among the several objects of the invention may be noted the provision of a trolley collector combining a trolley wheel and sliding shoe wherein the wheel functions only as a guide and the shoe only as the current collector; the provision of a mounting for the wheel and shoe such that the pressure relationship between each and the wire may be controlled and better electrical contact be obtained without the use of any pressure spring other than that employed to press the trolley pole upwardly; the provision of noiseless apparatus of this class; and the provision of apparatus of this class in which inertia effects and the consequent tendency to jump the trolley wire are reduced. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawing, in which is illustrated one of various possible embodiments of the invention, Fig. 1 is a side elevation of the apparatus; and, Fig. 2 is a horizontal section taken on line 2—2 of Fig. 1.

Similar reference characters indicate corresponding parts throughout the several views of the drawing.

Referring now more particularly to Fig. 1, there is shown at numeral 1 a trolley pole of the class ordinarily used on electric vehicles such as street railway cars, electric buses and the like. The pole 1 extends from the roof of the vehicle at an angle and by means of a linkage and spring at the vehicle roof is normally pressed in the direction shown by the arrow. Numeral 3 represents the trolley wire from which current is to be collected and transferred to the trolley pole 1.

A harp 5 is secured to the pole 1 by clamp screws 7. The harp supports a gudgeon 9 which mounts the inner race of a ball bearing 11 secured by a lock nut 13. The outer race of this bearing is secured by the sealing nut 17 in a rocker 15.

The rear end of the rocker has a lateral lug 19 through which passes a cap screw 21 insulated from the lug by an insulating washer 23 and bushing 25. This cap screw 21 screws into a rectangular stud 27, the upper end of which is cast into a hardened steel slide shoe 29. The shoe 29 is electrically connected to the socket of the harp by the screw 21, a flexible lead 31 and one of the clamp screws 7. No current can, therefore, reach nor pass through the ball bearing 11. The current passes only through the shoe 29, stud 27, cap screw 21, lead 31, harp 5 to the pole 1.

The central part of the rocker carries on a gudgeon 32 a ball bearing 33 with the inner race secured by a lock nut 34. The outer race of this bearing is held in a sleeve 35 and secured by a cap 37. The sleeve 35 forms the hub of the trolley wheel, indicated in general by numeral 36.

The trolley wheel 36 is made up of metal or other wear resisting side plates or flanges 39 enclosing a rubber core 41. The side plates are mounted between insulating washers 42. The plates 39, washers 42, and core 41 are locked together on the hub 35 when the cap 37 is screwed against the outer race of the bearing 33. The washers 42 and core 41 are composed of tough vulcanized rubber or equivalent resilient and/or insulating material.

The support 9 for the rocker is at a point between the center of the wheel and the point of contact of the slide with the trolley wire. Hence, as the pole is pressed against the wire, the pressure acting at the point of the rocker support holds both the wheel and slide against the wire. For a given force tending to hold the wheel and the shoe against the wire, any given relationship of pressure on the wheel and on the shoe may be effected by properly choosing the distances between the wheel center on the one hand and center of pressure of the shoe on the other hand with respect to the rocker pivot 9. Thus the design lends itself to the ready provision of variations in relative pressures to meet trolley wire conditions.

The advantage of this construction is that the wheel functions only as a guide and having a rubber core, is practically noiseless. The shoe functions only as a collector and makes better electrical contact than does a rolling wheel. The rocker and harp are preferably made of strong alloy aluminum to minimize the effect of inertia when the wheel passes over a trolley wire hanger or other uneven spot in the wire. The ordinary trolley wheel often jumps at such points causing arcing and burning of the wheel and wire. In this invention, if the wheel jumps, the pressure of the slide on the wire is increased by the rocker action. The slide, having very little inertia, is kept in contact with the wire as long as the pole exerts any upward force against the wire. This prevents arcing and the wire wears smooth which in turn tends to minimize wear on the slide. The flanges 39 serve to guide the wheel and resist consequent rubbing wear at curves and the like. It will be seen that the rubber core 41 and rubber washers 42 prevent current from traveling from the wire 3 through the wheel. The core 41 effectually minimizes noise.

Another advantage of the invention is that the bearings are enclosed and can be packed with lubricant so that the apparatus may be kept in service for a long time without attention or lubrication of bearings or renewals of parts.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawing shall be interpreted as illustrative and not in a limiting sense.

We claim:

1. A trolley collector for a trolley pole comprising a harp mounted on and electrically contacting the pole, a rocker, a rotatable trolley wheel on said rocker, a collecting shoe attached to said rocker, means for pivoting the rocker to the harp at a point between the center of rotation of the wheel and the region of contact between the trolley and shoe, means for insulating the collector shoe from the rocker, means for carrying current therefrom to the pole, means for insulating the wheel from the rocker, and a resilient core for the wheel adapted to contact the trolley.

2. A trolley collector for a trolley pole comprising a harp mounted on and electrically contacting the pole, a rocker, a rotatable trolley wheel on said rocker, a collecting shoe attached to said rocker, means for pivoting the rocker to the harp at a point between the center of rotation of the wheel and the region of contact between the trolley and shoe, means for insulating the collector shoe from the rocker, means for carrying current therefrom to the pole, and a resilient part on the wheel adapted to normally contact the trolley.

3. A trolley collector for a trolley pole comprising a harp mounted on and electrically contacting the pole, a rocker, a rotatable trolley wheel on said rocker, a collecting shoe attached to said rocker, means for pivoting the rocker to the harp at a point between the center of rotation of the wheel and the region of contact between the trolley and shoe, means for insulating the collector shoe from the rocker, means for carrying current therefrom to the pole, and a resilient part on the wheel adapted to normally contact the trolley, said resilient part being composed of electrically insulating material.

4. A trolley collector for a trolley pole comprising a harp mounted on and electrically contacting the pole, a rocker, a rotatable trolley wheel on said rocker, a collecting shoe attached to said rocker, means for pivoting the rocker to the harp at a point between the center of rotation of the wheel and the region of contact between the trolley and shoe, means for insulating the collector shoe from the rocker, means for carrying current therefrom to the pole, and an insulating part on the wheel adapted to normally contact the trolley.

5. A trolley collector for a trolley pole comprising a harp mounted on and electrically contacting the pole, a rocker, a rotatable trolley wheel on said rocker, a collecting shoe attached to said rocker, means for pivoting the rocker to the harp at a point between the center of rotation of the wheel and the region of contact between the trolley and shoe, means for insulating the collector shoe from the rocker, means for carrying current therefrom to the pole, and means insulating the wheel from the rocker.

ARTHUR W. BAUMGARTEN.
HARVEY S. PARDEE.